Jan. 13, 1942.  C. MARINELLO  2,269,631
TRANSPORTATION BODY CONSTRUCTION
Filed March 29, 1940  5 Sheets-Sheet 1
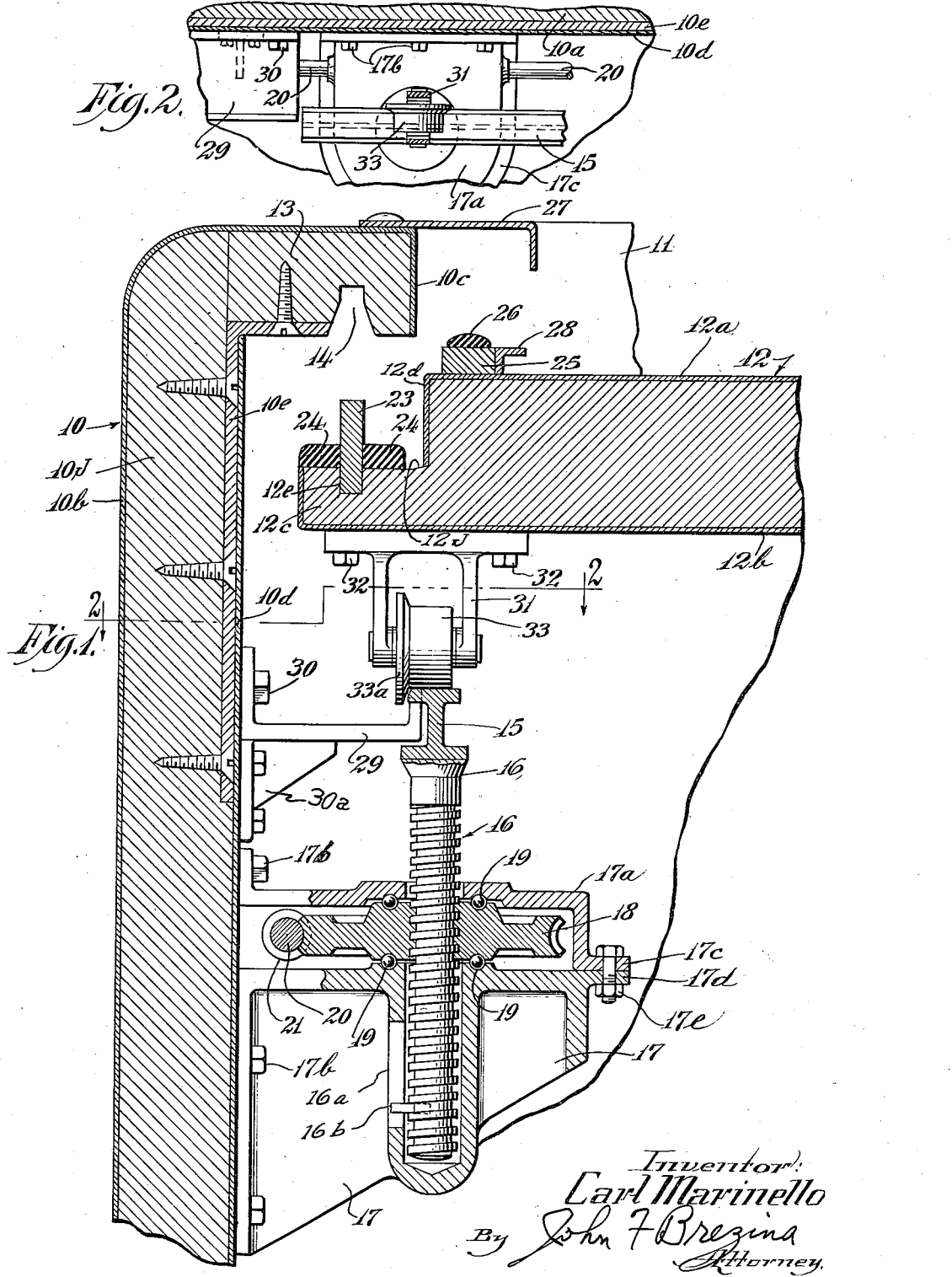
Inventor:
Carl Marinello
By John F Brezina
Attorney.

Jan. 13, 1942.  C. MARINELLO  2,269,631
TRANSPORTATION BODY CONSTRUCTION
Filed March 29, 1940  5 Sheets-Sheet 2
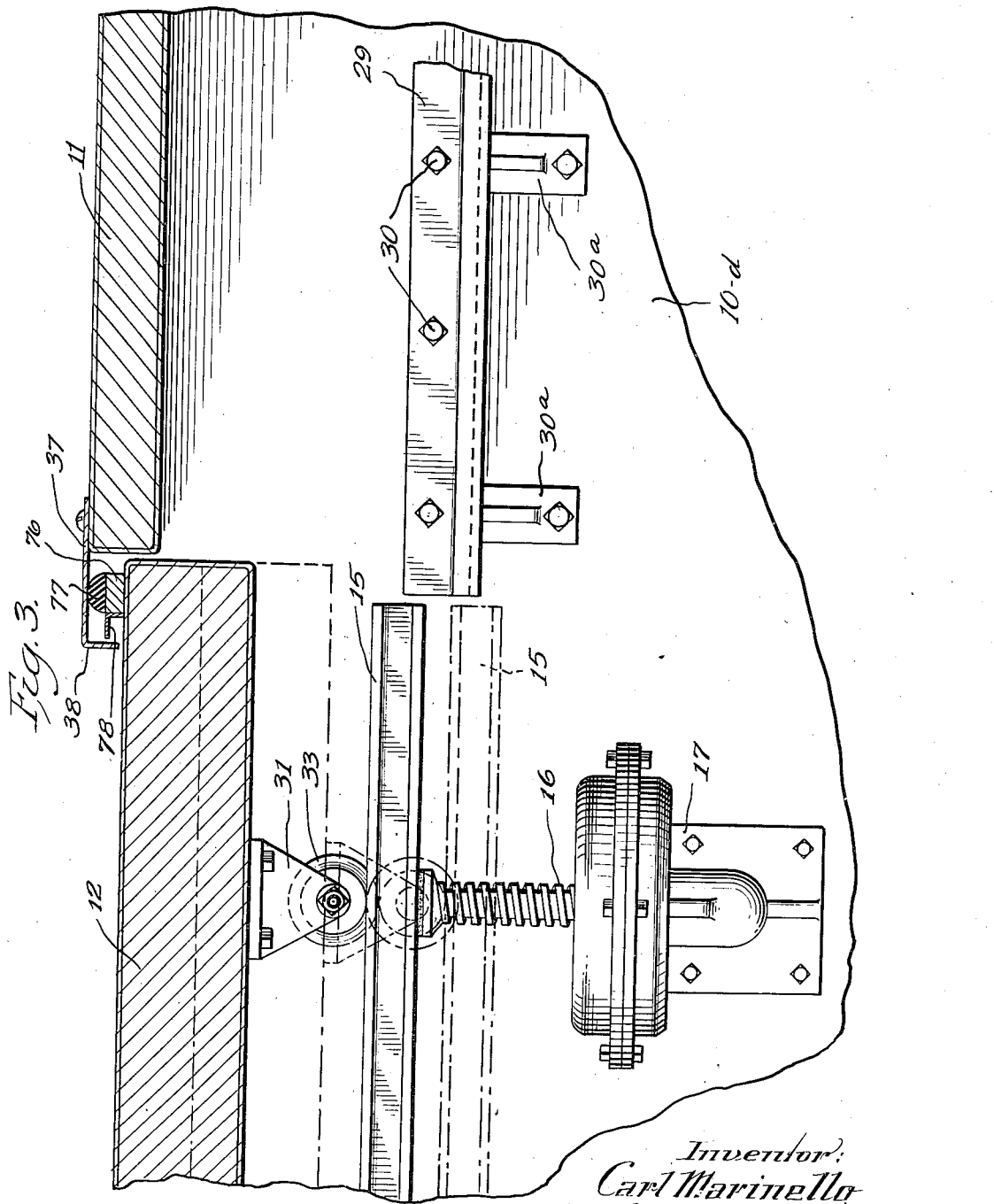
Inventor:
Carl Marinello
By John F Brezina
Attorney.

Jan. 13, 1942.            C. MARINELLO            2,269,631
TRANSPORTATION BODY CONSTRUCTION
Filed March 29, 1940            5 Sheets-Sheet 3
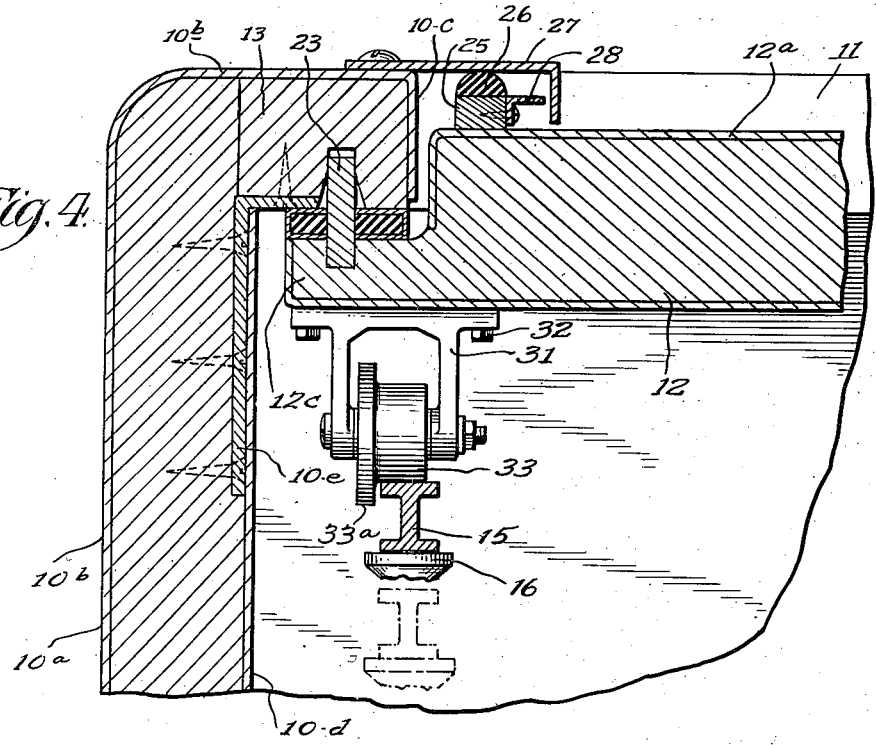
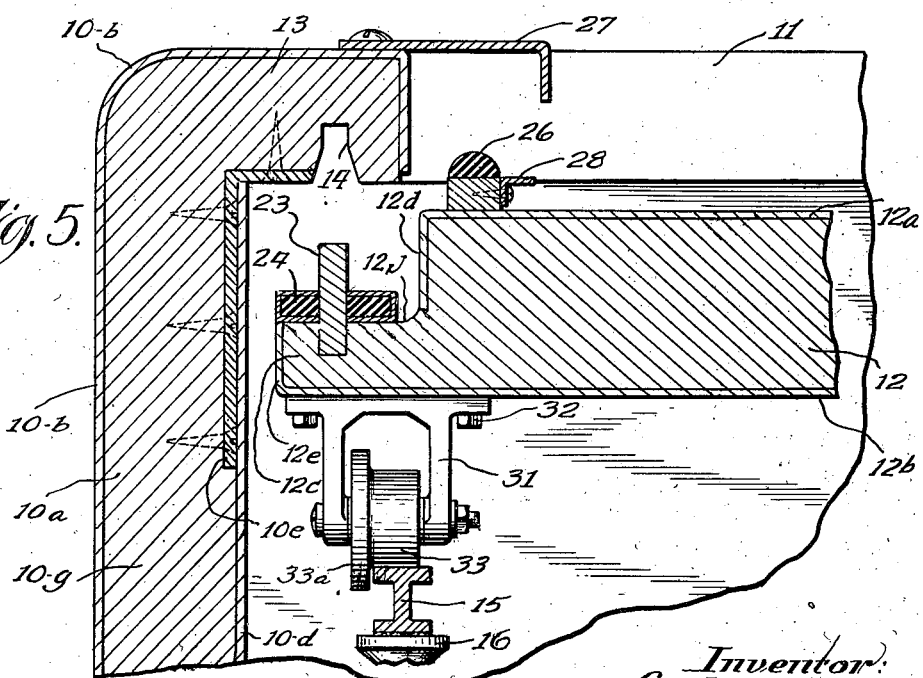

Jan. 13, 1942.  C. MARINELLO  2,269,631
TRANSPORTATION BODY CONSTRUCTION
Filed March 29, 1940  5 Sheets-Sheet 4
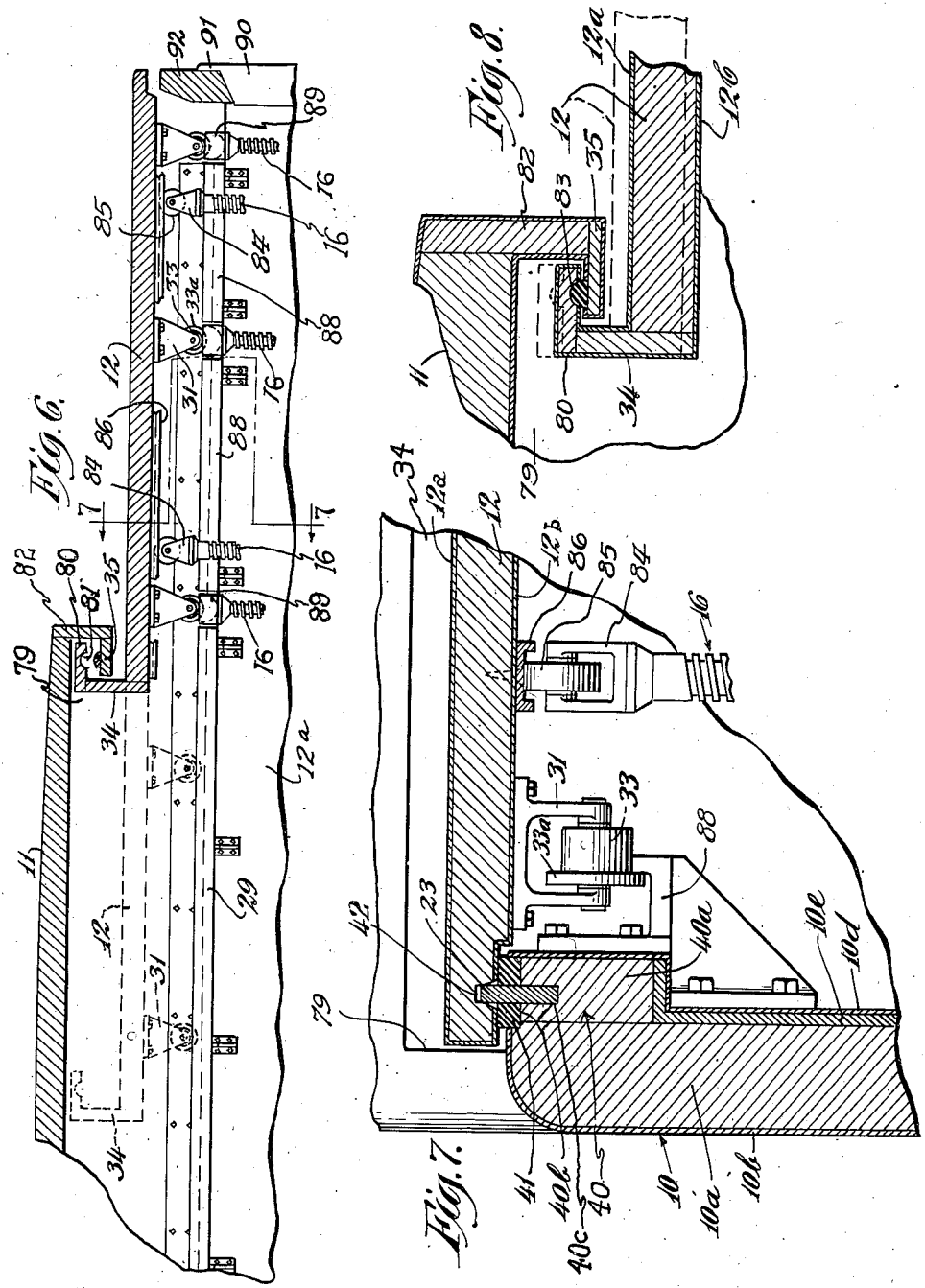
Inventor:
Carl Marinello
By John F. Bregina
Attorney.

Jan. 13, 1942.  C. MARINELLO  2,269,631
TRANSPORTATION BODY CONSTRUCTION
Filed March 29, 1940  5 Sheets-Sheet 5
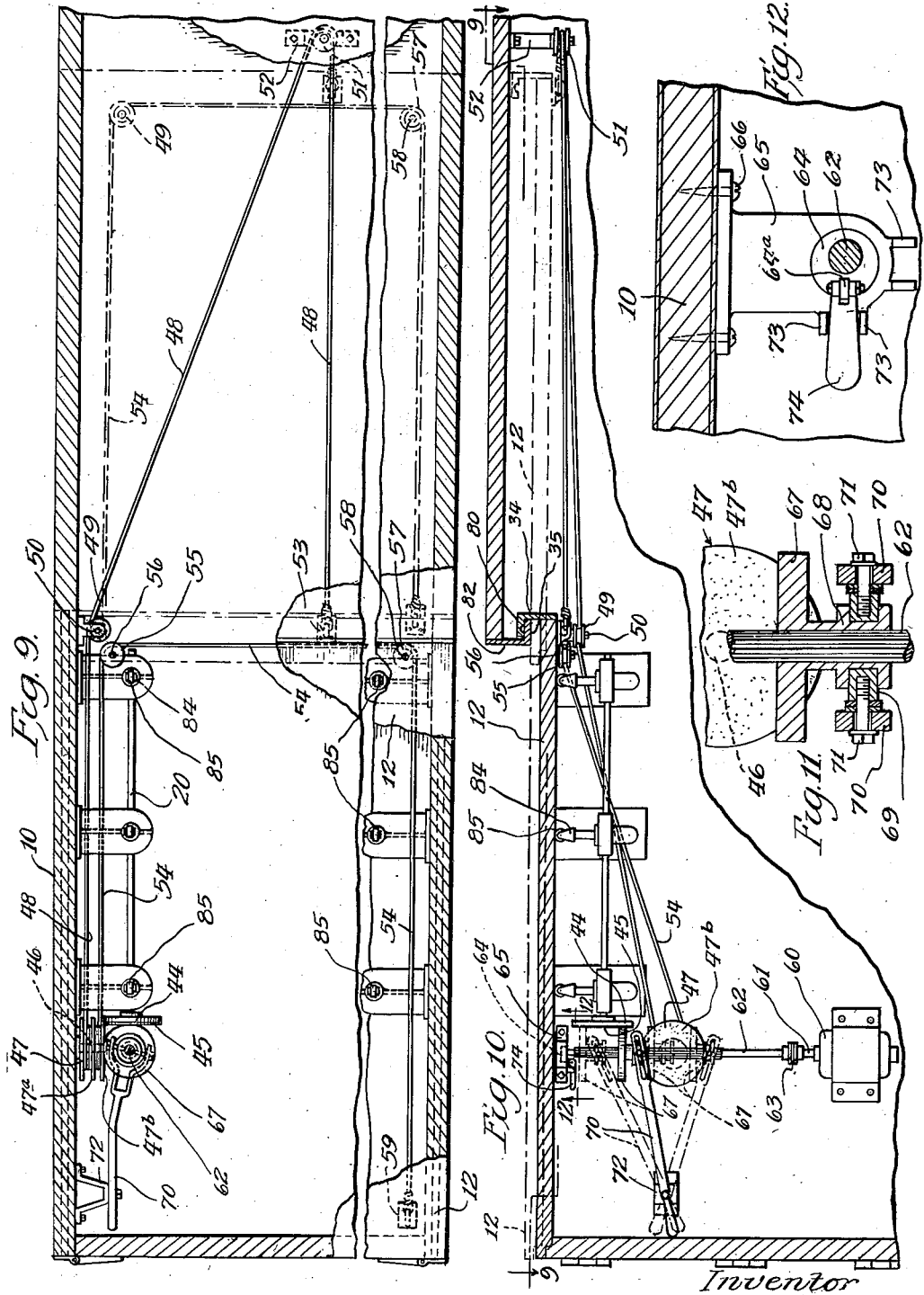
Inventor
Carl Marinello
By John F. Brezina Attorney Patented Jan. 13, 1942

2,269,631

UNITED STATES PATENT OFFICE 2,269,631

TRANSPORTATION BODY CONSTRUCTION

Carl Marinello, Chicago, Ill.

Application March 29, 1940, Serial No. 326,888

25 Claims. (Cl. 105—377)

My invention constitutes a novel construction of transportation body for trucks, trailers, railroad cars, inclosed type vehicles in general, and any movable cargo unit used to transport goods and merchandise including watercraft, and also includes novel means and mechanism operable manually or by power means for elevating or lowering a closure element such as a movable roof section, door, hatch, slug, and the like, said mechanism and means being controlled and operable selectively.

My present invention has as one of its major objects the provision of conversion and transformation of normally enclosed trailer, truck and transport bodies, which are frequently of an insulated refrigerator type to units which are openable and exposable from the top to permit overhead loading and unloading of goods and products with the aid of overhead conventional loading equipment, and eliminates the present unadaptability of the inclosed bodies frequently used for transporting perishable goods to equipment adaptable for economical transport, including loading and unloading, of heavy materials and merchandise.

A further object of my invention is the provision of a movably mounted section, slug, hatch, or roof section in combination with means for rollably mounting same with respect to the stationary parts of the transportation unit and the provision of suitable sealing members to prevent entry of rain, snow, and other elements and to permit maintenance of desired temperatures within the transportation unit irrespective of surrounding atmosphere temperatures.

A further object of my invention is the provision of a normally enclosed and substantially sealable transportation body or unit provided with a movable section adapted to be moved into and out of closing position and lifting means operable either manually or selectively by power to move the closure member into and out of closing position.

A further object of my invention is the provision of a power driven transmission mechanism adapted to be mounted upon a stationary portion of the body near the movable roof section or other closure, said mechanism being drivable by an electric motor, and having mechanism for transmitting desired movement to lifting mechanism which I provide and to means and mechanism for pulling and pushing the closure element to and from closing position.

A further object of my invention is the provision of a movable closure element adapted for use in connection with transportation units in which the closure member, slug, door, or the like may be rolled over the adjacent stationary portions of the transportation body as well as under such stationary portions.

Other and further important objects and accomplishments of my invention will be apparent from the following description and appended claims.

Fig. 1 is a cross-sectional and partially fragmentary view taken on a vertical plane through a corner of the transportation body, illustrating a movable roof section, adapted to be lifted to uppermost position to seal the same.

Fig. 2 is a top plan view looking downwardly and taken on line 2—2 of Fig. 1.

Fig. 3 is an enlarged fragmentary view looking at the inside side wall of the transportation body and showing the movable slug with movable track elevated into upper sealed position, and illustrating in dotted lines the lowered position of said slug and movable track.

Fig. 4 is an enlarged transverse cross-sectional view of the corner of the transportation body showing the movable slug in upraised sealed position.

Fig. 5 is a cross-sectional view of a corner of the transportation body similar to Fig. 4 except showing the movable slug and its movable supporting track in lowered position.

Fig. 6 is a partially cross-sectional and partially side-elevational view on a vertical plane longitudinally of the transportation body and showing the movable roof section in upper open position.

Fig. 7 is an enlarged cross-sectional view taken of a body corner on a vertical plane indicated by lines 7—7 of Fig. 6.

Fig. 8 is an enlarged fragmentary and cross-sectional view of the seal or cooperating ends at the line of juncture between the movable and the stationary roof sections.

Fig. 9 is a partial side elevation of the inside of the body side wall and partial cross section taken on line 9—9 of Fig. 10 and illustrating a means and mechanism either operable by a motor or other power unit or optionally manually, for lifting and longitudinally moving said movable roof section. Fig. 10 is a vertical cross sectional view looking at the interior of the left wall of the body.

Fig. 11 is an enlarged cross sectional view of the slidable friction wheel and hub forming part of the power transmission means.

Fig. 12 is an enlarged cross section taken on line 12—12 of Fig. 10.

Reference numeral 10 designates a normally enclosed truck, trailer, car or the like which may be provided with suitable doors of conventional construction (shown in Figs. 9 and 10) which doors may be either at the side or back of the enclosed body. The inclosed body includes the side walls 10, only one of which is shown in the drawings of Fig. 1, and the stationary roof portion 11, which connects the upper edges of the side walls across all that portion of the area not closable by the movable roof section 12. Numeral 10b designates the outer sheet metal protecting wall of the side walls 10, which in Fig. 1 extends upwardly and over the rounded corners of the truck, only one of which is shown, and thence extends horizontally over a corner member 13, and is bent at right angles and downwardly to form the flange 10c, as clearly indicated in Fig. 1.

The side walls of the truck are preferably formed of a plurality of vertically extending trusses 10f of the conventional type, in addition to having the outer wall 10b secured thereon, have a similar inner metal wall 10d secured by screws or the like to said trusses to thereby make a substantially smooth surfaced inner metal wall. In the construction of the body proper, the corner truss 13, which extends longitudinally along each upper corner of the body, is additionally secured in position by a plurality of angular reinforcing brackets 10e, which are mounted upon the respective spaced apart vertically extending trusses 10f of the side walls. The uppermost arms of each of the brackets 10e are suitably secured as by screws to each of the corner trusses 13, only one of which is shown in Fig. 1. It is to be noted that each of the upper portions of the sheet metal linings or walls 10d extend over and cover the major portion of the brackets 10e. Each of the corner trusses 13 are provided with a longitudinally extending groove 14 of a substantial depth, which grooves are adapted to receive a metal sealing bar 23 of the movable roof portion itself when the latter is mounted into closed sealed position.

Reference numeral 15 designates one of a pair of longitudinally extending tracks which may be of either I shaped cross-section or other suitable form. Each of these tracks 15 extend from points adjacent to the rear edge of the body to points below the juncture of the movable roof section 12 and the stationary roof portion 11. Each of these tracks are secured by welding or the like to the upper ends of a plurality of jackscrews 16 (two or more in number adjacent to each side of the body). The respective screws 16 form portions of manually or power operated jackscrews which may be of any conventional type, and which may be operated either individually and independently or the jackscrews on one side wall may be connected in series to be actuated uniformly and in unison.

In the particular embodiment illustrated in Fig. 1, the elevating jack comprises the bracket-like base portion 17 and the cooperating centrally passaged metal cap 17a, both of which are secured to the side wall, preferably to certain of the vertically extending trusses 10f thereof by means of a plurality of suitable lag screws 17b as clearly shown in Fig. 1. The metal cap portion of the housing 17a is provided with a peripheral integral apertured flange 17c, whose apertures register with corresponding apertures in a corresponding flange 17d of the lower portion of the elevating jack and which registering apertures have mounted therein a plurality of bolts 17e, one of which is shown in Fig. 1. The lower bracket portion 17 of the lifting jack includes a depending well in which the lower end of the threaded screw 16 is vertically movable. Jackscrew 16 carries a properly spaced stop stud 16b which rides in vertical slot 16a formed in wall of well of each lifting device, said stud 16b preventing axial rotation of screw 16 and limiting upward travel of each said screws 16 and guides jackscrew 16 properly in vertical movement to properly locate track 15.

Reference numeral 18 designates an externally threaded gear wheel whose internal threads engage and interfit with the threads of the jackscrew 16 so that rotative movement of gear wheel 18 and vertical movement of jackscrew 16 takes place. Reference numeral 19 designates suitable ball-bearings interposed between the opposite surfaces of the hub of gear wheel 18 and the bracket portion of housing 17 and metal cap portion 17a respectively.

While vertical movement of jackscrews may be effected by any one of a number of conventional mechanical manually or power operated means presently known in the art, I have illustrated in the drawings of my co-pending application one form in which two or more jackscrews 16 which are mounted along each side wall of the transportation body are operated in unison and simultaneously.

The shaft or shafts 20 are adapted to be rotated also manually by a removable crank (not shown) mounted on the end thereof or by a ratchet wrench or ratchet mechanism (not shown), though illustrated in my co-pending application Serial No. 325,605, filed March 23, 1940) mounted preferably at either end of the shaft and at whichever position it is more desirable.

The movable roof section or slug 12 is preferably constructed so that it includes a plurality of transversely extending spaced apart trusses inclosed within the outside sheet metal wall 12a and inner sheet metal wall 12b. The movable roof section or slug has each of its lateral edges formed with a corner recess 12f so that the lower portion of the transverse trusses and the inner sheet metal wall 12b provide a laterally extending portion or flange 12c, each of which extend the entire length of the slug 12. It will be noted that the upper sheet metal wall has its lateral edges turned angularly to form a protective edge or flange 12d, which defines the side surface of the said edge recess.

Each of the horizontally extending edge flanges 12c of the movable roof section or slug 12 is provided with a longitudinally extending, upwardly opening groove 12e, adjacent its edges, into each of which grooves 12e is secured the lower portion of the sealing bar 23, as indicated in cross-section in Fig. 1. Numeral 24 designates yieldable and resilient sealing strips, preferably made of rubber or other suitable composition material, one on each side of the sealing bar 23. Similarly, in actual construction the resilient sealing strips 24 may be made in one piece and slotted and the sealing bar 23 passed through such slot and mounted in secured position with respect to the movable slug or roof section 12.

Referring to Figs. 4 and 5, reference numeral 25 designates one of two longitudinally extending sealing strips which are mounted longitudinally upon the movable roof section or slug 12 adjacent the edge recesses thereof, each of said sealing strips (which may be of either metal or wood) have secured thereon a yieldable and resilient weather-strip 26. The numeral 27 designates one of two longitudinally extending metal flanges which are preferably of angular cross section, the outermost edge thereof being bent downwardly as indicated in Fig. 1 and the other lateral edge thereof being suitably secured by welding, screws, or equivalent means along the upper surface of the outer sheet metal wall 10b so that the major portion of each of said protecting flanges 27 project inwardly of the transportation body as shown in Figs. 4 and 5. An angular bar 28, preferably of right angle cross section, is secured against each of two longitudinal strips 25 by screws or the like so that one flange of each thereof project inwardly with respect to the side walls of the truck body and toward each other.

When the movable roof section or slug 12 is elevated to uppermost and sealing position, the downwardly opening recess 14 receives the projecting portion of the metal sealing bar 23, and the inner surface of the flange 27 engages and presses against the weather-strip 26, so as to provide weather-proof seals between the movable roof section or slug 12 and the stationary portions of the transportation body. The function of the angular bars 28 is to deflect the rain and wind-blown spray from the seal between the weather-strip 26 and the protecting flange 27.

Further describing the movement and operation of the movable slug from closed sealed position to open position wherein it temporarily lies under the stationary roof portion 11, I provide a pair of metal tracks 29 which may be of any suitable form but which in the form of Figs. 1, 3, and 7 are shown as of U shaped cross section, each of these tracks being mounted by bolts or screws 30, and by spaced brackets 30a, in horizontal position upon the inner surfaces of the side walls of the transportation body and below the stationary and permanent roof portion 11. These tracks 29 are mounted at a height which will place their roller engaging edges at a height identical with the upper surface of the lowered movable track rails 15 respectively so that the rear track rails 15 and the forward track rails 29 will be in respective alignment when rear track rails 15 are in lowered position.

I provide the movable slug or roof section 12 with a plurality of suitable metal journalling brackets 31 in spaced apart position, preferably two, three, or possibly more in alignment along each lateral edge of the movable slug or roof section 12. These journalling brackets are secured to the movable slug 12 by suitable screws or bolts 32, and the downwardly extending arm portions of each of said brackets have journalled thereon a flanged roller or caster 33, which rollers roll along the rear track rails 15 as well as upon the outer flanges of forward tracks 29. Each of the rollers 33 are preferably provided with an integral circumferential flange 33a which acts to guide the movable slug in its longitudinal movement through engagement of said flanges with the edges of the track rails 15 and tracks 29 respectively. The peripheral flanges of said rollers 33 act to guide longitudinal movement of the slug on said rails.

In moving the movable slug from closed sealed position, the elevating jacks on each side of the transportation body are operated, either individually or simultaneously, to lower the jackscrews 16 and rails 15 to effect gravity descent of the movable roof section supported thereby, and when such descent has reached a position wherein the upper surface of the track rails 15 are in alignment with the riding flanged edges of tracks 29, the movable roof section is pushed or pulled either manually or by power mechanism to roll upon the two inwardly extending tracks 29 as far as it is desired to fully or partially open and expose the rear portion of the transportation body for overhead loading and unloading. In the preferred operation, the movable roof section is moved entirely underneath the stationary and permanent roof portion 11.

When the overhead loading operation is completed, the movable roof section is moved from its open forward position by rolling the same back upon the two track rails 15, whereupon operation of the respective lifting jacks will lift the movable roof section into closed and sealed position, which has been previously described. In moving the roof section either upwardly or downwardly, it is more desirable to operate the elevating jacks upon one side of the transportation body substantially equally to avoid imparting excessive twisting and torsional stresses to the movable slug or roof section 12.

Reference to Fig. 3 discloses a side elevational fragmentary view of one of the elevating jacks 17 with the movable jackscrew 16 having secured thereon one of the rear track rails 15, which is shown in upraised position wherein it is supporting the movable slug 12 in closed sealed position with respect to the side walls and with respect to the stationary roof portion 11. One of the rollers is shown as resting upon one of the rails 15, roller 33 being journalled in journalling bracket 31, which is secured to the movable slug 12.

In Fig. 4, the dotted line position of one of the rear track rails 15 indicates the lowered position of each thereof, from which lowered position the movable slug 12 is moved longitudinally under the remaining stationary roof portion 11.

Inasmuch as forming a movable roof section at either the rear or intermediate portion of the transportation body will form one or more transversely extending joints or crack-like openings at the junctures of the movable slug and the stationary roof portions when the former is in closed position, I provide a suitable weather-proof protecting seal for such junctures, which otherwise would permit entry of rain, snow, etc. One form of this weather protecting and insulating means is illustrated at the upper portion of Fig. 3. Reference numeral 76 designates a transversely extending bar of wood, metal or the like which is mounted adjacent the transverse edge of the movable slug and extending across said slug, and the bar 76 has secured thereon a suitable weather-strip 77 and also a rearwardly projecting angular metal bar 78, which is secured by screws or the like passing therethrough and into the transverse bar 76. Numeral 37 designates a protective metal shield which has one of its lateral edges secured by welding or equivalent means across the edge portion of the stationary roof portion 11 and in a position so that its angularly and downwardly bent flange 38 will overlie the edge portion of the movable slug as illustrated in Fig. 3. When the movable slug is raised to its extreme upper position, the engagement of the weather-strip 77 with the inner surface of shield 37 forms a weather-proof joint or seal, and secondly, the horizontally extending flange of the angular bar 78 prevents most of the water, spray, snow, etc., from actually entering the area beneath the shield 37 and adjacent weather-strip 77.

Referring to the right hand portion of Fig. 6, the upper fragment of one of a pair of conventional doors 90 is shown as provided with an optional flange 91 and each of which doors may be of a length and height so that the upper edge of such doors 90 engage the lower edge surface of the rear end of movable roof section 12 to form an effective seal. In Fig. 6, the said rearmost end of movable roof section 10 is illustrated as provided with a transverse downwardly opening recess, with which the upper edge portions of the suitably hinged doors will engage. In Fig. 6, I have shown in cross section a transversely extending header which may be formed of a suitable bar either stationarily secured at its opposite ends to the side walls of the transportation body, or connected thereto by releasable means. The use of such header 92 is optional according to the particular desire and dependent upon the height of the doors 90.

While I have described the foregoing as one of my preferred constructions wherein the movable roof section or slug 12 forms the rear portion of the roof itself, it is to be emphasized that this movable roof section or slug may be of any desired area, and may comprise any fractional part of the entire roof area, either representing less or more than one-half the complete roof area and adapted to be built in an intermediate position with respect to the entire roof area, or at either the front or rear thereof.

Fig. 4 is a cross sectional view of a corner portion of the movable slug and of the transportation body taken on a vertical plane, and illustrates the movable roof section or slug 12 in elevated sealed position with respect to the remainder of the transportation body. In this figure the respective parts bear numerals corresponding to those shown in Fig. 1. In Fig. 5 I have illustrated the lowered position of the movable slug 12, in which position the track rails 15 are lowered into alignment with the pair of metal tracks 29 so that the movable roof section 12 may be rolled into open position beneath the adjacent stationary roof portion of the transportation body.

In Figs. 6 to 8 inclusive I have illustrated an embodiment of my invention in which the transportation body, either of a truck, trailer or car, is provided with a movable roof section 12 which may comprise either the rear, front, or intermediate portion of the roof itself, and which is mounted for vertical and longitudinal movement in a manner substantially similar to that which has been hereinbefore described. This embodiment of my invention in certain parts only represents a slight modification of the preferred form illustrated in Figs. 1 to 5 inclusive, it employing a pair of forward metal track rails 29, each of which is mounted by suitable brackets adjacent to the inside walls respectively beneath the stationary portion 11 of the transportation body and anchored by brackets either to the respective adjacent side walls or to the ceiling of the stationary roof portion.

The movable slug 12 is itself of a cross-truss frame construction provided with inner sheet metal wall 12b and outer sheet metal wall 12a, the lateral edges of which outer wall 12a are bent angularly and secured along the lateral edges of the movable slug 12 as indicated in Fig. 7. Referring to Fig. 7, the vertically extending side walls 10 are provided with outer sheet metal protective walls 10b and inner sheet metal protective walls 10d, and are constructed with an inwardly projecting portion 40, which is formed by securing longitudinally extending trusses 40a, preferably made of wood, along the upper edge thereof and thence bending and securing inner sheet metal wall 10d to project inwardly and upwardly to the inner upper corner of said shoulder or projecting portion 40, as illustrated in cross section in Fig. 7. Shoulder portions 40 are secured and supported by a plurality of angular metal brackets 10e.

Each of the inwardly projecting abutments, shoulders or portions 40 of the side walls 10 are provided with an upwardly opening longitudinal recess 40b, and also with longitudinally extending grooves 40c, which are located centrally of each of said recesses 40b, as clearly shown in Fig. 7. A pair of metal sealing bars 23 are mounted respectively in the longitudinally extending grooves 40c, which project upwardly above the recesses 40b respectively. A pair of yieldable weather-strips 41 are mounted along the opposite sides of the metal sealing bar 23 and within each of the longitudinally extending recesses 40b, and extend along the upper surface of each of the inwardly projecting abutments or portions 40.

In this form it is to be noted that the portion of the transportation body which is normally closed by the movable roof section 12 is of less height than the adjacent stationary roof portion 11, and that those portions of the side walls partially defining the opening which is normally closed by the movable roof section 12, terminate a short distance below the normal plane of the stationary roof section 11, and that the movable roof section 12 is adapted to slide under the adjacent stationary roof section 11 in the manner herein described.

Figs. 6 and 8 illustrate a cooperating releasable sealing means between the forward end of the movable roof section and the adjacent edge of the stationary roof portion. Reference numeral 34 designates the transversely and vertically extending sealing bar whose ends preferably extend beyond the lateral edges of slug 12 and ride respectively in the longitudinal inwardly extending recesses 79 formed in the respective side walls 10, and whose ends seat against the shoulders formed at the rear ends of said recesses 79 to thereby form a satisfactory seal against entry of snow and rain.

Numeral 80 designates a transversely and rearwardly extending sealing strip, one of whose lateral edges is secured upon the upper edge of the cross bar 34. Strip 80 carries a downwardly opening longitudinal groove 81. Strip 80 is substantially parallel to and above the forward end of the movable slug 12.

82 represents a transversely extending strip forming a shield which has its upper edge portion secured to the rear edge of the stationary roof portion 11, and carries on its lower end a substantially horizontal strip 35 which has mounted on its upper face a suitable weather-strip 83 which engages and seats in the groove 81 of strip 80 to thereby form an effective seal.

As shown in Figs. 6 and 7, the upper movable ends of jackscrews 16 are shown partially broken away and secured on their upper ends are the U shaped journalling brackets 84 with rollers 85 journalled therein, which rollably engage the U shaped tracks 86 respectively mounted on the inner surface of the movable roof section 12.

I desire it to be understood that the movable roof section 12 may be elevated optionally, or if desired, simultaneously by lifting devices such as illustrated and described hereinbefore having movable heads or screws 16 thereon, and that the movable roof section may be rolled longitudinally on the respective rollers 85 during part of the longitudinal movement and until the respective rollers 33 engage the forward stationary tracks 29 respectively which are anchored below the stationary portion of the roof as indicated at the left of Fig. 6.

I also provide two stationary spaced apart track segments 88 on each of the body side walls 10, the forward ends of the foremost track sections 88 being spaced a short distance from the rear ends of the stationary tracks 29, and the rearmost track sections being spaced from the rear ends respectively of the foremost track sections 88, as indicated in Fig. 6. This construction provides a space between the two track sections 88 on each side wall, and also provides a gap or space between the foremost ends of tracks 88 and the ends of tracks 29 respectively. Below each of said gaps or spaces, and also at points substantially below the rear ends of the rear track section 88 are mounted a plurality of suitable selectively operable jacking or lifting devices of the types herein described and the movable heads of which are also indicated by the reference numeral 16.

Upon each of jack heads 16 I secure a suitable track segment 89, whose construction is preferably similar to that of track sections 88. These track segments 89 are permanently secured to jack heads 16 and therefore move therewith, to selectively position said track segments into alignment with the respective track sections 88 and tracks 29 respectively when it is desired to roll the movable roof section 12 to open position. Such aligned positions of track segments 89 are maintained until the movable roof section 12 is rolled back into the position illustrated in Fig. 6, whereupon the operation of the jacking devices to lower heads or screws 16 will mount the movable roof section 12 into closed seated position, the respective track segments 89 being lower than, and in non-alignment with, track sections 88. This described means for vertically moving the movable roof section with its attached brackets 31 and rollers 33 may be employed either independently or in unison and in simultaneous operation with jackscrews 16 having brackets 64 and rollers 85 connected thereto.

In the embodiment of my invention illustrated in Figs. 6, 7 and 8, the movable roof section 12 is provided with a pair of longitudinally extending recesses 42, a short distance from each of its side edges, these downwardly opening recesses 42 being parallel and being spaced apart to receive respectively the upper projecting portions of the metal sealing bars 23.

In the top plan view of Fig. 9 which is taken on a horizontal plane through the side walls below the roof section and on lines 9—9 of Fig. 10, I illustrate the upper ends of the respective jackscrews 16, which are mounted in jacking devices indicated in spaced apart positions along each of the side walls 10 and which are operated in the manner hereinbefore described, though in this embodiment are operated in unison by a common drive shaft 20, which has suitably spaced spiral gears thereon for operating the gears of the jacking devices to in turn elevate or lower the screws 16, as before described. The rear end of shaft 20 has mounted thereon a friction wheel 44, which has a suitable friction facing 45 on its flat surface made of suitable material, such as fabric, fiber, or other composition material.

Inasmuch as the movable roof section closure element or slug in constructed commercial refrigerator type bodies which have been made are of substantial weight and of relatively rigid construction, I provide as a part of my invention means and mechanism adapted to be selectively power driven or manually operated by moving the movable roof section or closure element vertically and also longitudinally to and from closed position. In Figs. 9 to 12 inclusive, I have illustrated one form of means and mechanism adapted to be driven by an electric motor and power transmission means for selectively raising or lowering the lifting devices and for selectively closing or opening the closure element or slug.

The upper ends of each of the jackscrews 16 each have a suitable journalling bracket 84 secured thereon, each of which carries a roller 85 journalled therein as shown also in Figs. 6 and 7. These rollers 85 rollably engage the movable closure element or slug 12 to permit longitudinal rolling movement of said closure element or slug. In Figs. 6 and 7, I illustrate the rollers 85 engaging an inverted U-shaped track 86 to guide longitudinal movement of the movable slug. I desire that it be understood that said tracks 86 may be dispensed with as illustrated in Fig. 10.

Mounted on a suitable journalling post 46 secured perpendicularly in one of the side walls 10 is a cable reel 47, which has centrally disposed circumferential flange 47a and which has secured on its flat outer surface a suitable fibrous disk 47b. A flexible cable 48, preferably made of woven wire, has one end wound in clock-wise direction upon the inner section of said reel 47, said cable extending along and adjacent the side wall 10 and rollably engaging a suitably grooved pulley 49, which is journalled in substantially horizontal position in a journalling bracket 50, which is secured by bolts or the like to side wall 10 at a point substantially below the juncture of the movable roof section and the stationary roof portion. The flexible cable extends and rollably engages the grooved pulley 51 which is journalled on bracket 52, which in turn is secured to the ceiling surface of the stationary roof section substantially near the front end of the body, as illustrated at the right of Figs. 9 and 10. Said cable 48 thence extends rearwardly and has its end anchored to a suitable eyelet bracket 53, which is secured by screws or the like to the forward edge of the movable slug. It will be apparent that counterclock-wise rotation of the reel 47 will wind-up and pull the cable 48 to open the movable closure element or slug 12.

A suitable flexible cable 54 is wound on the outer section of the reel 47 and outside of central flange 47a so that it extends tangentially from the bottom periphery of said reel to be mounted on and rollably engage a suitably grooved pulley 55, which is rotatably journalled on the vertically extending portions of the journalling post 56, whose shank is suitably secured in the corner portion of the movable slug 12. The flexible cable 54 extends to and rotatably engages the grooved pulley 57, which is journalled upon a downwardly extending post 58, which in turn is secured in the opposite corner portions of the movable slug. The cable 54 thence extends rearwardly and has its end anchored to a suitable eyelet bracket 59, shown at the left-hand lower corner of Fig. 9.

Cable 54 is of such length that when the reel 47 is rotated counterclock-wise to cause opening movement of the movable slug, the cable 54 is unwound from its reel section to take the position substantially as illustrated in dotted lines in the right-hand portions of Fig. 9. When it is desired to move the movable roof section 12 to closed position, the reel 47 is rotated clock-wise to in turn cause cable 54 to be wound up on its reel to pull the movable roof section into position over its normally seated position.

I desire it to be understood that both the cable reel 47 and the wheel 44 may be rotated either manually or power means for selective rotation thereof may be provided, one form of which I have illustrated and described in the following.

Reference numeral 60 designates a suitable electric motor adapted to be connected to and driven by an electric power source in the vicinity of loading and unloading of the transportation body, said motor being secured by suitable bolts to the side wall 10 of the transportation body and preferably adjacent the rear end thereof and at a point substantially below the reel 47 and friction wheel 44. The motor 60 has upwardly projecting armature shaft 61, which is connected to an elongated splined shaft 62 by a flexible coupling 63, shown in side elevation in Fig. 10. As illustrated in both Figs. 10 and 12, the upper end of the splined shaft 62 is rotatably mounted in a cam bearing 64, which cam bearing in turn is rotatably journalled in a suitable projecting metal bracket 65, which is secured by screws 66 or the like to the side wall 10 and substantially near the upper edge thereof.

Slidably mounted on the splined portion of the shaft 62 is a friction wheel 67 having an integrally concentric, circumferentially grooved hub portion 68. As illustrated in Fig. 11, a metal collar 69 is rotatably mounted to rotate in the annular groove of the hub portion 68, and the spaced apart arm portions of a yoke lever 70 are pivotally secured by bolts 71 to the collar 69. Lever 70 is pivoted intermediate its end by a suitable bolt to metal bracket 72, which is secured to and projects from the side wall 10, as illustrated in Figs. 9 and 10, the point of securance being such as to permit selective movement of friction wheel 67 from points adjacent the lower periphery of the outer face of reel 47 to points adjacent the upper periphery of friction wheel 44.

Referring to Fig. 12, reference numeral 73 designates a plurality of spaced apart projecting studs which are formed upon the edge of the outer end of the journalling bracket 65. The cam bearing 64 is provided with an outwardly extending apertured ear 64a, and a handle 74 has one bifurcated end thereof pivotally connected to the apertured ear 64a, as illustrated in Fig. 12, said handle forming a means for rotating the cam bearing 64 in its bracket 65 to thereby move the splined shaft 62 so that the friction wheel 67 may be moved into and out of contact with the friction face lining 45 and selectively into and out of contact with the exterior face or disk 47b of the reel 47.

It will be apparent that through movement of the lever 70 and friction wheel 67 to the upper and lower peripheries of the reel facing or disk 47b will result in transmitting the movement of the electric motor to wind said reel in either direction, it being understood that when the friction wheel 67 is to be moved longitudinally on splined shaft 62 that the cam bearing 64 will be moved through movement of handle 74 to a position which will move shaft 62 slightly to break frictional engagement of the friction wheel 67 with the reel facing or disk 47b. Likewise when it is desired to rotate shaft 20 in either direction to move the respective jackscrews 16 upwardly or downwardly, the lever 70 is moved to the uppermost dotted line positions illustrated at the left of Fig. 10.

This means and mechanism provides for selectively transmitting the power movement to the lifting devices in either direction and for selectively opening or closing the movable slug through rotation of the cable reel 47 in the desired direction.

It is to be understood that where in the specification and claims hereof I have made reference to "power means" or "power driven mechanism" and the like which I utilize to actuate or operate the lifting device or the structure and mechanism for moving the closure element horizontally, that said terms fully contemplate the substitution and utilization of power means or power mechanism other than that specifically illustrated herein in the preferred form or specifically described, such other forms being for example fluid operated or compress or vacuum air operated power elements or utilization of the normal combustion engine power of the vehicle suitably transmitted to the desired parts.

I desire that it be specifically understood that where I have herein and in the claims referred to "enclosed body" or "normally enclosed body" it does not mean or is so to be interpreted as a completely sealed body or as one having a complete non-apertured wall, but also means a body whose members may be formed with stakes or trusses with openings therebetween and which are merely sufficient to retain articles of and packages of merchandise.

While I have illustrated the selective power driven mechanism for elevating or lowering the jackscrews on one side wall, it is to be understood that the jackscrews on the opposite side wall may be moved in either direction either with a similar power driven mechanism to that described or if desired by manual means hereinbefore pointed out.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In a transportation body having an opening, a longitudinally, upwardly and downwardly movable closure for said opening; flange elements on said closure for engaging portions of said body to form a seal; substantially coplanar track rails mounted on said body; roller elements rotatably mounted on said closure element and adapted to ride on said track rails, and manually actuable jacks mounted on the side walls of said body and when operated adapted to disengage said roller elements from said track rails and to elevate said closure element out of closing position to permit longitudinal sliding movement thereof, the downward movement of said jacks being adapted to mount said closure into seated closing position.

2. In a transportation body having an upper opening and having portions of its side walls projecting inwardly and partially defining said opening; a vertically and horizontally movable roof section for sealing said body opening when in operative position, said movable roof section being adapted to be raised from sealed position and moved horizontally to inoperative position; a plurality of parallel substantially coplanar track rails mounted upon the inside of said body and below the plane of said roof section, the rails on each side of said body being aligned and having their adjacent ends spaced apart; bracket mounted roller means on said movable roof section, the rollers of said roller means being adapted to move vertically between the said spaced apart ends of said rails and being adapted to ride on said rails when said movable roof section is moved horizontally to and from open position; and separable sealing members on the lateral edge portions of said movable roof section and on said inwardly projecting side wall portions respectively adapted to interengage to effect sealed engagement when said roof section is lowered.

3. In a transportation body having a stationary roof portion and having an upper opening and having portions of its side walls projecting inwardly; a vertically and horizontally movable roof section adapted to substantially seal said body opening when in operative position; a plurality of vertically movable substantially coplanar track rails mounted upon the inside of said body and below the roof; screw means mounted on the body side walls and supporting said track rails; bracket mounted roller means on said movable roof section normally supported by said track rails, said movable roof section being adapted to ride on said track rails during horizontal movement thereof to and from open position; said roller means being adapted to disengage said track rails respectively when said roof section is moved horizontally beyond the ends of said track rails; cooperating sealing elements on the lateral edge portions of said movable roof section and on said inwardly projecting side wall portions adapted to form a separable seal therebetween; and manually controllable lifting and pulling means on said body for selectively moving said roof section upwardly to unseal said roof section and for moving said roof section longitudinally of the transportation body and into and from inoperative position.

4. In a transportation body having an upper opening and having portions of its side walls projecting inwardly and partially defining said opening; a horizontally and vertically movable roof section for sealing said body opening; said movable roof section being adapted to unseal said opening on upward movement and being movable horizontally to inoperative position; a plurality of parallel substantially coplanar track rails mounted upon the inside of said body and below the plane of said roof section; bracket mounted roller means on the edges of said movable roof section and adapted to support the same, said roller means being adapted to ride on said rails when said roof section is moved horizontally to and from open position; cooperating and separable sealing members on the lateral edge portions of said roof section and on said inwardly projecting side wall portions respectively; jack devices mounted below said movable roof section and below said tracks and adapted to elevate and lower said tracks and the roof section normally supported thereon; and power driven means for selectively operating said jack devices to elevate or lower said tracks and supported roof section and for moving said movable roof section substantially horizontally into and out of sealed position.

5. In a normally enclosed transportation body having an upper opening and a stationary roof portion; side walls terminating in inwardly extending flange portions and having movable rear doors for closing the rear of said body; an upwardly, downwardly and horizontally movable roof section, said side wall flange portions each having a projecting longitudinal sealing strip therein, said movable roof section having downwardly opening grooves for receiving said sealing strips respectively; the upper ends of said doors being adapted to engage the rear end of said movable roof section to form a seal therebetween; bracket mounted roller elements secured on the movable roof section; rails mounted along the side walls of said body and below the stationary roof thereof; said movable roof section being adapted to ride on said rails when said movable roof section is moved horizontally; manually operable elevating means on said body adapted to move said movable roof section upwardly to unsealing position whereby said movable roof section may thence be moved horizontally to cause said roller elements to ride on said rails; cooperating sealing elements on the forward end of said movable roof section and on the stationary roof portion respectively and adapted to be unsealed on upward movement of said movable roof section; and manually operable means for moving said movable roof section horizontally on said rails.

6. In a normally enclosed transportation body having an upper opening, a stationary roof portion and side walls terminating in inwardly projecting flange portions; said flange portions having longitudinal grooves therein; a sealing strip in each of said grooves; a vertically and horizontally movable roof section for closing said body opening and having longitudinal edge recesses cooperable with said sealing strips respectively; parallel rails mounted adjacent the inside of said body side walls respectively and below the stationary roof portion; roller elements rotatably connected to said movable roof section, said roller elements being adapted to ride on said rails and to support said movable roof section during its horizontal and opening movements; power driven means on said transportation body for moving said movable roof section vertically to unsealed position and thence horizontally; and cooperating interengaging separable sealing elements on the forward end of said movable roof section and on said stationary roof portion respectively.

7. In a normally enclosed transportation body having a stationary roof portion and having an upper opening; a vertically and horizontally movable roof section for normally sealing said body opening; journalled roller elements connected to said movable roof section and adapted to normally support said movable roof section; parallel substantially coplanar track rails mounted on the inside of the body side walls below said stationary roof portion; parallel substantially coplanar track rails mounted on the inside of the body side walls below said movable roof portion, said track rails below said stationary roof section having their ends spaced apart and providing openings therebetween to permit movement therein of said roller elements; manually operable means mounted on said transportation body for elevating and lowering said roller elements and said movable roof section into and from sealed position and into positions to cause said roller elements to ride on said aligned track rails to permit said movable roof section to be moved horizontally to inoperative position; a sealing strip along each lateral edge of said movable roof section; and inwardly projecting sealing flanges mounted on said body side walls adapted to be engaged by said movable roof section sealing strips when said movable roof section is lowered to unsealing position or raised to sealing position.

8. In an enclosed vehicle body having a stationary roof section, an upper opening and a movable roof section for sealing said opening, said movable roof section being movable vertically to unseal the same and being movable horizontally to expose said body opening; power means mounted on said vehicle body for selectively lowering and raising said movable roof section into and out of sealed position and for selectively moving said movable roof section substantially horizontally in juxtaposition to said stationary roof section; a plurality of parallel substantially coplanar track sections mounted on the vertically movable portions of said power means; and roller elements rotatably mounted on the surface of said movable roof section and normally engaging said track sections to support said movable roof section thereon, said roller elements providing for horizontal rolling movement of said movable roof section on said track sections into and from unsealed inoperative positions.

9. In an enclosed vehicle body having a stationary roof section and having a horizontally and longitudinally movable roof section; substantially horizontal parallel stationary tracks mounted on said body below said stationary roof section; a plurality of jacking devices mounted on said body and below said movable roof section; separate parallel tracks on said jacking devices and vertically movable therewith and adapted to be substantially aligned with said stationary tracks; roller elements connected to and journalled with respect to said movable roof section and normally supporting said movable roof section on said tracks whereby said movable roof section is rollable along said movable tracks and said stationary tracks; and manually operable means on said body for selectively actuating said jack devices to align said movable tracks with said stationary tracks and to selectively raise said movable roof section into operative sealed position.

10. In an enclosed vehicle body having a stationary roof section and a horizontally and vertically movable roof section; jack devices mounted on said body and below said movable roof section; parallel track sections mounted on the movable portions of said jacking devices; roller elements journalled with respect to said movable roof section to provide for longitudinal rolling movement thereof on said movable track sections; coplanar parallel stationary track rails on said body, said jacking devices being adapted to move said movable roof section vertically and to move said movable track sections into alignment with said stationary track rails to provide for roller-supported horizontal movement of said movable roof section on said movable track sections and on sad stationary track rails; and manually controllable power means on said body to move said movable track sections into and out of alignment with said stationary track rails and for horizontally moving said movable roof section on said track sections and said track rails.

11. In a normally enclosed vehicle body having a vertically and horizontally movable roof section, an upper opening and a movable roof section adapted to close said body opening; interfitting cooperating sealing elements on said movable roof section and said vehicle body; parallel rails adjacent said stationary roof section and on the side walls of said body; jacking means on the side walls of said body; coplanar parallel movable track sections on said jacking means and adapted to be raised or lowered on said jacking means; roller elements rotatably connected to said movable roof section and normally supporting said movable roof section and normally engaging said track sections; said jacking means being adapted to raise said movable track sections and said movable roof section supported thereon into sealed operative position, the lowering movements of said jacking means being adapted to lower said movable roof section to unsealed position; parallel stationary rails adjacent said stationary roof section and on said body, the rollers of said movable roof section being adapted to ride on said track sections and rails when said track sections are aligned with said rails; and manually controllable power means on said body for operating said jacking devices to lower said movable roof section to unsealed position and to align said track sections with said rails and for moving said movable roof section horizontally on said track sections and said rails.

12. In an enclosed vehicle body having a stationary roof section, an opening and a movable roof section for closing said opening; interfitting cooperating sealing elements between said horizontally and vertically movable roof sections and said transportation body and cooperating sealing elements on the end of said movable roof section and on said stationary roof portions respectively; roller elements journalled on said movable roof section; means on the body side walls respectively for selectively lowering and raising said movable track sections including a plurality of jacking devices, a shaft drivingly connecting the jacking devices on each side wall whereby the jacking devices on each side wall may be operated in unison; track sections on the movable portions of said jacking devices and vertically movable therewith; said lowering and raising means being adapted to selectively raise or lower said track sections and said roller supported movable roof section into and out of sealed operative position, and manually operable means for operating said connecting shafts and said jacking devices; said movable roof section being movable horizontally after movement thereof to unsealed inoperative position.

13. In a transportation body having an upper opening, and having movable doors connected to its rear end and adapted to close the rear opening of said body; a vertically and horizontally movable closure for said upper opening; said closure being movable vertically to unseal it from said upper opening; flange elements on said closure for engaging portions of said body to form a seal; substantially coplanar parallel and spaced track rails mounted on said body; roller elements rotatably connected to said closure element and normally supporting said closure element and adapted to ride on said track rails when said closure is moved horizontally, and manually actuable jacks mounted on the body side walls and adapted, when operated, to elevate said closure element out of closing position to unsealed position; the upper ends of said movable doors being adapted to engage the rear end of said closure element to form a seal therebetween.

14. In a normally enclosed vehicle body including side walls and rear doors movably connected with respect to said side walls and having a closable opening in the upper portion of said body; a transversely extending header connecting said side walls to the top of said rear doorclosable opening, said doors being adapted to engage said header to form a seal; a vertically and horizontally movable closure element for closing said upper body opening; lifting devices mounted on said side walls respectively for moving said closure element substantially vertically to and from said closed and seated position; stationary rails mounted adjacent to side walls and below said stationary roof section and below said upper body opening; roller elements rotatably connected to said closure element and adapted to support said closure element on said rails, said rails being coplanar and substantially parallel and said roller elements disengaging said rails when said movable closure element is moved into fully closed position.

15. In an enclosed vehicle body having side walls, a stationary roof section and a movable roof section; sealing elements along the lateral edges of said movable roof section; the upper edges of said side walls defining an opening and having recesses therein respectively for receiving the sealing elements of said movable roof section respectively; rollers connected to and journalled on said movable roof section; a plurality of jacking devices mounted on said side walls and below said movable roof section; said jacking devices when elevated supporting said rollers and movable roof section and adapted to move said movable track rails in substantial alignment with said stationary rails; a track rail mounted on the jacking devices of each side wall; and movable therewith; separate stationary substantially coplanar and parallel tracks on said side walls respectively and below said stationary roof section; and manually actuable means for operating said jacking devices upwardly and downwardly to raise or lower said track rails and said movable roof section to permit longitudinal rolling movement of said movable roof section on said track rails and on said stationary tracks.

16. In an enclosed vehicle body having side walls and an upper opening; a stationary roof section and a movable roof section, said movable roof section being movable vertically to unseal the same and being movable horizontally to inoperative position; sealing elements along the lateral edges of said movable roof section; the upper edges of said side walls defining the opening having recesses therein respectively for receiving the sealing elements of said movable roof section respectively; rollers connected to and journalled on said movable roof section, said rollers supporting said movable roof section during horizontal movement; a plurality of jacking devices mounted on said side walls and below said movable roof section; a track rail mounted on the jacking devices of each side wall; separate stationary parallel coplanar tracks on said side walls respectively and below said stationary roof section; the lowering of said jack devices and said track rails thereon being adapted to lower the movable roof section from sealing engagement and to align said track rails and said stationary tracks to permit rolling of said movable roof section into open position upon said stationary tracks; and manually controllable power means for moving said jacking devices upwardly and downwardly and for moving said movable roof section longitudinally on said track rails and said stationary tracks.

17. In an enclosed vehicle body having side walls; a stationary roof section, an upper opening and a movable roof section; sealing elements along the lateral edges of said movable roof section; the upper edges of said side walls defining the opening having recesses therein respectively for receiving the sealing elements of said movable roof section respectively; rollers connected to and journalled on said movable roof section, said rollers supporting said movable roof section during horizontal movement; a plurality of jacking devices mounted on said side walls and below said movable roof section; parallel track rails mounted on the jacking devices of each side wall; separate coplanar stationary tracks on said side walls respectively and below said stationary roof section; said jacking devices supporting said track rails and adapted to move the same into alignment with said stationary tracks; and manually controllable power means for moving said jacking devices upwardly and downwardly and for moving said movable roof section vertically and longitudinally, said manually controllable power means including rotatably mounted cable reels; spaced apart cable pulleys and cables connecting said movable roof section and said reels and adapted to effect forward and backward horizontal movement of said movable roof section on rotative movement of said reels.

18. In a normally enclosed vehicle body having side walls and a stationary roof section and an upper opening normally closable by a movable roof section, a vertically and horizontally movable roof section for closing said upper opening; parallel tracks on the body side walls, roller elements rotatably connected to said movable roof section and normally engaging said tracks; cooperating sealing members on said movable roof section and on said side walls respectively and at the junctures thereof; a plurality of lifting devices mounted along the body side walls and adapted to lift said movable roof section to unseal the same and to permit horizontal movement thereof; mechanism mounted adjacent one wall for driving the lifting devices in unison and including a common driven shaft; a rotatably mounted cable reel mounted adjacent one of said side walls; a flexible cable connecting said reel and the forward end of said movable roof section and being movably anchored on the forward portions of said body to provide for cable-opening movement of said movable roof section; a second flexible cable on said reel and having its end connected with respect to said body and to said movable roof section to provide for closing movement of said movable roof section; power driven means on said transportation body, and selectively operable power transmision mechanism for selectively and alternately operating said reel and said cables to horizontally move said movable roof section to open and closed positions.

19. In a normally enclosed vehicle body having side walls and a stationary roof section and an upper opening normally closable by a movable roof section; a horizontally and vertically movable roof section for closing said upper opening; cooperating sealing members on said movable roof section and on said side walls respectively and at the junctures thereof; a plurality of lifting devices mounted along the body side walls and adapted to lift and lower said movable roof section to seal and unseal the same and to permit its horizontal movement; mechanism for driving the lifting devices adjacent one wall and in unison and including a common driven shaft; a rotatably mounted cable reel mounted adjacent one of said side walls; a flexible cable connecting said reel and the forward end of said movable roof section and being movably anchored on the forward portions of said body to provide for cable opening horizontal movement of said movable roof section; a second flexible cable on said reel and having its end connected with respect to said body and to said movable roof section to provide for horizontal closing movement of said movable roof section; power driven means on said transportation body for rotating said reel and operating said lifting devices; and manually actuable power transmission mechanism adapted to selectively transmit the rotated movement from said power unit to wind said reel in either direction and to operate said cables for alternate opening or closing movements and to selectively drive said driven shaft to operate said lifting devices in either direction.

20. In combination with a transportation body having an upper opening and a horizontally and vertically movable section adapted to close said opening and to expose the interior of the body; an electric power unit mounted on said body; a pair of flexible cables having rotatable connections on said body and having their respective ends connected to said movable roof section and adapted to move the same horizontally; a cable pulley adapted to be driven by said electric power unit, the other ends of said flexible cables being connected to opposite ends respectively of said movable section so that rotation of said cable pulley in one direction will cause horizontal closing movement of said movable section and its rotation in the other direction will cause horizontal opening movement thereof, and a manually controllable reversing mechanism for causing said pulley to rotate in either direction.

21. In a normally enclosed vehicle body including side walls and a stationary roof section; a longitudinally and horizontally movable roof section adapted to expose the body interior; a pair of forward stationary substantially coplanar track rails anchored below the stationary roof portion and adjacent the side walls; a plurality of spaced apart aligned track sections mounted on the side walls below the closable roof opening; said track sections on each side wall being aligned and coplanar with said forward track rails; a plurality of lifting devices mounted below said closable opening and adapted to move said movable roof section vertically; track segments on said lifting devices and normally between the ends of said track sections adapted to be placed by said lifting devices into alignment with said spaced apart track sections; and bracket mounted roller elements on said movable roof section and normally supporting said movable roof section adapted to ride on said track sections, track segments, and said stationary track rails, said movable roof section being adapted to ride longitudinally and horizontally on said aligned track sections, track segments and track rails to expose a part of the body interior.

22. In a normally enclosed vehicle body including side walls and a stationary roof section; a vertically and horizontally movable roof section adapted to expose the body interior; cooperating sealing elements on the edges of said movable roof section, on said side walls and on the edge portion of the stationary roof portion adjacent said movable roof section; a pair of substantially coplanar track rails anchored below the stationary roof portion and adjacent the side walls and extending forwardly from points below the juncture of said movable roof section and said stationary roof portion; a plurality of spaced apart aligned horizontally extending track sections mounted on the side walls below the closable roof opening, the track sections on each side wall being aligned with each other and with one of said forward track rails; a plurality of lifting devices mounted below said closable opening and adapted to move said movable roof section vertically to unsealed position; track segments on said lifting devices adapted to be moved into alignment with said spaced apart track sections respectively, and bracket mounted roller elements rotatably connected to said movable roof section and adapted to ride on said track sections, track segments and said forward track rails, said elevating of said track segments and said roller elements and the movable roof section supported by said roller elements providing for horizontal opening movement of said movable roof section to expose a part of the body interior; the opposite horizontal movement and lowering of said movable roof section being adapted to close the body opening normally closed by said roof section.

23. In a normally enclosed vehicle body including side walls and a stationary roof section; a horizontally and upwardly movable roof section adapted to expose the body interior; a pair of parallel coplanar stationary track rails anchored below the stationary roof portion and adjacent the side walls; a plurality of spaced apart aligned parallel track sections mounted on the side walls below the closable roof opening, said track sections on each side wall being aligned with said forward track rails; a plurality of lifting devices mounted below said closable opening and adapted to move said movable roof section vertically into unsealing position; track segments adapted to be placed into alignment with said spaced apart track sections and mounted on said lifting devices; bracket mounted roller elements on said movable roof section and adapted to ride on said track sections, track segments and said stationary track rails, said roller elements normally supporting said roof section on said track rails and track sections; and power driven mechanism on said body for selectively operating said lifting devices to move said track segments vertically and to move said movable roof section upwardly to unsealed position and horizontally to expose a part of the body interior to view, said power driven mechanism being adapted to effect return closing horizontal movement of said roof section.

24. In a normally enclosed vehicle body having a stationary roof section and stationary side walls and having a closable opening in the upper portion thereof; a vertically and horizontally movable closure element for closing said body opening; lifting devices mounted on said side walls respectively for moving said closure element to and from closed seated and sealed positions; rollers journalled on the upper ends of said lifting devices, said closure element being normally supported by said rollers during part of its longitudinal movement; stationary rails mounted adjacent the body side walls and below the stationary roof portion; and bracket mounted rollers on said movable closure element, said lifting devices being adapted to elevate said movable roof section to cause said bracket mounted rollers to align with and ride on said stationary rails during longitudinal horizontal movement of said closure element.

25. In a normally enclosed vehicle body including side walls and a stationary roof section; a vertically and horizontally movable roof section adapted to expose the body interior; cooperating sealing elements on the edges of said movable roof section, on said side walls and on the adjacent edge portion of the stationary roof portion; a pair of track rails anchored below the stationary roof portion and adjacent the side walls and extending forwardly from points below the juncture of said movable roof section and said stationary roof portion; a plurality of spaced apart aligned track sections mounted on each of the side walls below the closable roof opening, the track sections on each side wall having their ends spaced apart and being aligned with each other and with said forward track rails; a plurality of lifting devices mounted below said closable opening and adapted to move said movable roof section vertically; track segments mounted on said lifting devices adapted to be mounted between the spaced ends of said track sections and into alignment with said spaced apart track sections respectively; bracket mounted roller elements on said movable roof section and adapted to be moved by said lifting devices and adapted to ride on said track sections, track segments and said forward track rails, and power driven mechanism on said body for selectively operating said lifting devices to elevate said movable roof section and to permit horizontal movements of said movable roof section along said rails and said track sections.

CARL MARINELLO.